United States Patent [19]

Sedgwick et al.

[11] 4,051,967
[45] Oct. 4, 1977

[54] SNOWMOBILE TRAILER

[76] Inventors: Jarvis D. Sedgwick, 501 Fourth Ave.; Gordon C. Headlee, R.R. 1, both of Coon Rapids, Iowa 50058

[21] Appl. No.: 713,632

[22] Filed: Aug. 12, 1976

[51] Int. Cl.$^2$ ............................................. B60P 1/28
[52] U.S. Cl. .................................. 214/505; 214/390; 254/131
[58] Field of Search ............... 214/373, 505, 506, 390, 214/396; 280/414 B; 254/8 R, 131

[56] References Cited

U.S. PATENT DOCUMENTS

| | | | |
|---|---|---|---|
| 2,415,771 | 2/1947 | Agtmael | 214/373 |
| 3,604,579 | 9/1971 | Jenkins | 214/505 |
| 3,667,728 | 6/1972 | Garelick | 214/373 X |
| 3,747,787 | 7/1973 | Sloan et al. | 214/373 X |

FOREIGN PATENT DOCUMENTS

| | | | |
|---|---|---|---|
| 1,116,946 | 6/1968 | United Kingdom | 214/390 |

*Primary Examiner*—Albert J. Makay
*Attorney, Agent, or Firm*—Zarley, McKee, Thomte, Voorhees & Sease

[57] ABSTRACT

A U-shaped trailer frame is supported above the ground on wheels and includes a U-shaped sub-frame pivotally connected thereto for pivotal movement between raised and lowered positions with the front end of the sub-frame engaging the ground in the lower position and the rear end engaging the ground in the raised position. The snowmobile is loaded onto the trailer by pivoting the sub-frame to the down position and then driving the snowmobile into the sub-frame with the front end being supported on a bottom wall sub-frame portion. The sub-frame and snowmobile are then pivoted to the up position and a support member is moved under the snowmobile to support the rear end of the snowmobile on the sub-frame when the sub-frame and snowmobile are pivoted to a horizontal position for transport. Alternatively, one or more sub-frames may be carried on a trailer frame for loading and transporting more than one snowmobile.

8 Claims, 7 Drawing Figures

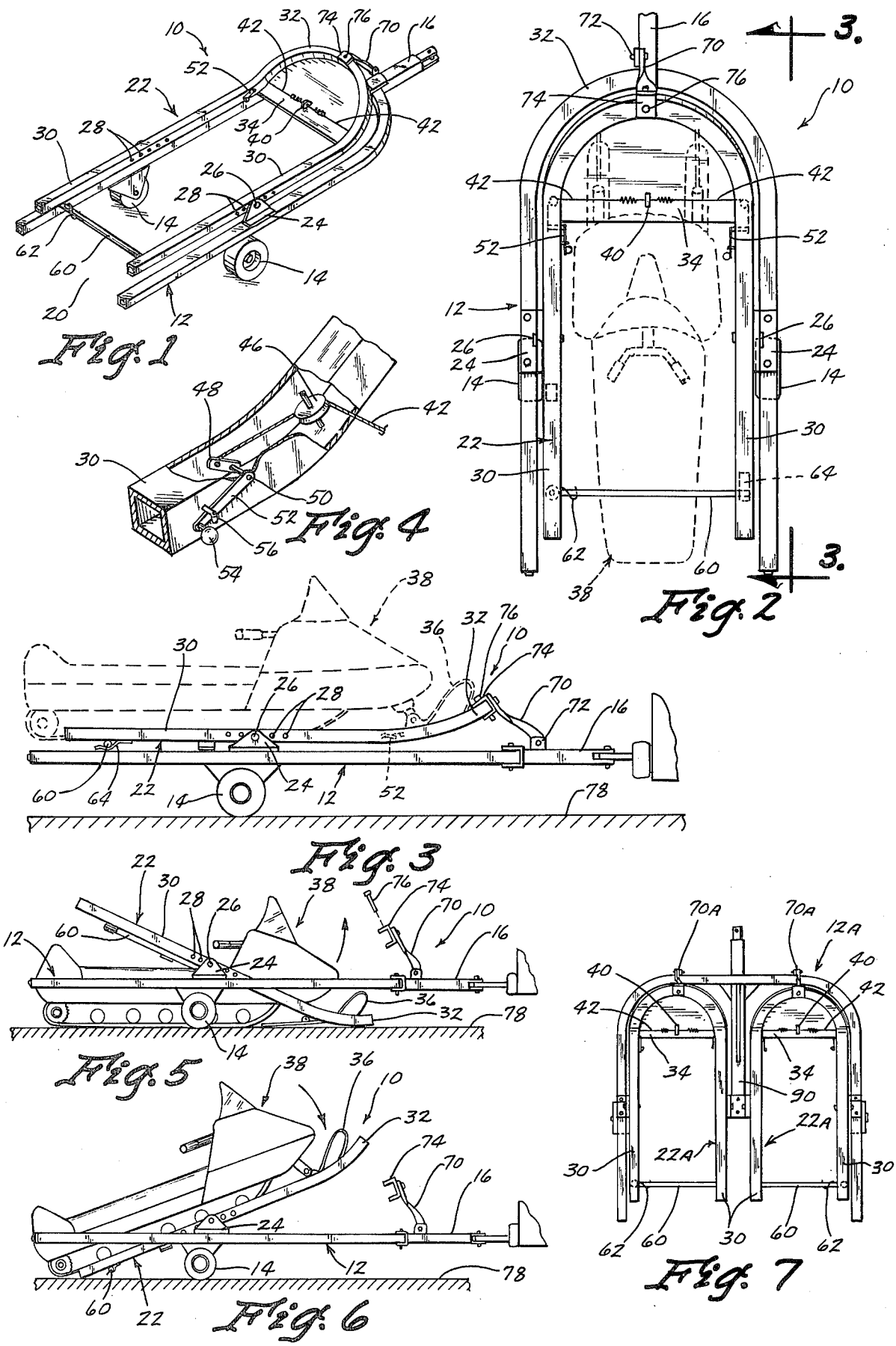

SNOWMOBILE TRAILER

BACKGROUND OF THE INVENTION

The use of snowmobiles involves transporting them between use areas. The trailers used for transport purposes typically involve a trailer bed which is tipped downwardly at the rear end and the snowmobile is either then driven on to the tipped bed or pushed thereon. Either mounting procedure is dangerous as the operator and bystanders may be injured or the equipment may be damaged. These procedures are unsatisfactory for the additional reason that it is usually more than a one man operation.

SUMMARY OF THE INVENTION

The snowmobile trailer of this invention can be loaded and unloaded by one man without endangering the equipment or the operator. The trailer involves a trailer frame which is U-shaped and is open at its rear end and between its side members. A U-shaped sub-frame is pivotally connected to the trailer frame for balanced pivotal movement between raised and lowered positions with the forward end of the sub-frame being up in the raised position and down in the lowered position. The loading procedure involves driving the snowmobile between the side members of the trailer and sub-frames with the runners of the snowmobile resting on a forward bottom wall portion of the sub-frame. The runners are locked to the side frame members of the sub-frame and the sub-frame is then pivoted from the down position to an up position thereby raising the forward end of the snowmobile and lowering the rear end of the sub-frame. Next, a support member is placed under the rear end of the snowmobile and is connected to the rear ends of the sub-frame whereupon pivotal movement of the sub-frame to a horizontal position will raise the rear end of the snowmobile off of the ground. The snowmobile is now raised for transport. The unloading procedure is accomplished by reversing the steps. More than one snowmobile may be transported by inclusion of more than one pivotal sub-frame connected to the trailer frame.

DESCRIPTION OF DRAWINGS

FIG. 1 is a perspective view of the snowmobile trailer of this invention.

FIG. 2 is a top plan view thereof.

FIG. 3 is a side elevation view taken along line 3—3 in FIG. 2.

FIG. 4 is a fragmentary perspective view of the locking mechanism for securing the front snowmobile sled runners to the sub-frame to limit forward and rear movement of the snowmobile on the trailer.

FIG. 5 is a side elevation view showing the trailer in a position ready to be loaded with the sub-frame pivoted to a down position.

FIG. 6 is a view similar to FIG. 5 but showing the sub-frame and front end of the snowmobile pivoted to an up position preparatory to placing a support member under the rear end of the snowmobile for raising the rear end off of the ground.

FIG. 7 is a top plan view of an alternate embodiment for transporting two snowmobiles.

DESCRIPTION OF PREFERRED EMBODIMENT

The snowmobile trailer of this invention is referred to in FIG. 1 by the reference to numeral 10 and includes a U-shaped trailer frame 12 having a pair of ground engaging wheels 14 and a tongue 16 for attachment to a towing vehicle not shown. The trailer frame 12 is open at its rear end 20 and along its length.

A U-shaped sub-frame 22 is pivotally connected by brackets 24 to adjacent side members of the trailer frame 12. A pin 26 may be positioned in one of a plurality of openings 28 in the side frame members 30 of the sub-frame 22 thereby allowing for attainment of the desired balance of the sub-frame on the trailer frame. The location of the pivotal axis will vary with the snowmobile being loaded as some snowmobiles vary in their weight distribution from front to rear. It is desired that a minimum effort be required to pivot the sub-frame and snowmobile between raised and lowered positions and this could be accomplished by the proper selection of a fulcrum point.

The front end 32 of the sub-frame 22 includes a bottom support wall portion 34 which engages the ground as seen in FIG. 5 when the sub-frame is pivoted to its lowered position. The bottom wall is further positioned so that the runners 36 of a snowmobile 38 may easily slide onto the bottom wall portion 34.

An eye bolt 40 is positioned intermediate the side frame members 30 of the sub-frame 22 on the bottom wall portion 34 for engagement by oppositely extending cable portions 42 as seen in FIG. 4 which extend over pulleys 46 in the hollow side frame members 30 and thence rearwardly to an upstanding lever 48 on a pivot shaft 50 connected to an actuating lever 52, having a handle 54 connected thereto at its rear end. A stop element 56 is provided to lock the lever 52 in a down position thereby keeping the cables 42 taut. The cables are designed to extend over the runners 36 of the snowmobile.

The rear ends of the side members 30 of the sub-frame 22 include a transversely extending snowmobile support member 60 pivotally connected to the left hand side member 30 and adapted to be pivoted to the transverse support position against the action of a spring 62 and held in the transverse position by a bracket 64 on the opposite side frame member 30.

The sub-frame 22 is held in a transport horizontal position parallel to and above the trailer frame 12 by a pivotal post 70 connected to an ear 72 on the tongue 16 of the trailer frame 12, as seen in FIG. 3. The post 70 includes a U-shaped rearwardly facing fastener 74 for engagement with the forward end of the sub-frame 22 and is adapted to be locked thereto by a removable pin 76 which passes through the legs of the U-shaped bracket and the sub-frame.

Thus in operation it is seen that the snowmobile 38 may be loaded onto the trailer 10 by first pivoting the sub-frame 22 to the down position of FIG. 5 with the forward end resting on the ground 78. Next the snowmobile 38 is driven or pushed into the U-shaped sub-frame 22 and trailer frame 12 with the runners 36 resting on the forward bottom support wall 34. Now the snowmobile and sub-frame are pivoted to the up position of FIG. 6 with the rear end of the sub-frame and snowmobile engaging the ground. Now the snowmobile is raised off the ground adjacent its rear end such that the rear support member 60 may be pivoted to its transversely extending support position of FIG. 2 and locked to the opposite side member 30 by the bracket 64. Next, the sub-frame 22 and the snowmobile are pivoted to the horizontal transport position of FIG. 3 whereby the rear end of the snowmobile is lifted off the ground as it is resting now on the rear support member 60. Finally, the post 70 is locked by the bracket 74 to the forward end of the sub-frame member 22 for use of the pin 76. The unloading procedure is accomplished by reversing the foregoing steps.

An alternate embodiment of the snowmobile trailer invention is shown in FIG. 7 and is suited for hauling two snowmobiles. A U-shaped trailer frame 12(a) is provided with a center member 90 extending between the side frame members 92 and 94. A pair of sub-frame members 22(a) are pivotally connected in side by side relationship to the side frame members 92 and 94 and the center member 90. Center member 90 functions as a common trailer side frame member for both sub-frames 22(a). Separate locking posts 70(a) are provided for locking the sub-frames 22(a) to the forward end of the trailer frame 12(a). The loading and unloading procedure is the same for the double vehicle trailer as it is for the single vehicle trailer.

Thus, it is seen that one or more snowmobiles may be easily loaded by one person onto a trailer without driving the snowmobile up an inclined trailer bed or pushing it up the incline. The most that is required is the pivoting of the sub-frame and snowmobile and the effort required for this may be minimized by the appropriate selection of the fulcrum point where the sub-frame pivots to the trailer frame. It is further seen that the trailer involves a minimum number of parts as it does not include any bottom wall except for the front runners 36 of the snowmobile which rest on the bottom wall portion 34 of the sub-frame 22.

What is claimed is:

1. A snowmobile trailer comprising,
    a trailer frame having front and rear ends and being U-shaped and open at its rear end,
    ground engaging wheels on said frame for supporting said trailer frame above the ground,
    a U-shaped sub-frame open at its rear end pivotally connected along its side members to adjacent side members of said trailer frame for pivotal movement between raised and lowered positions with said forward end being up in said raised position and said forward end being down in said lowered position,
    said trailer frame and sub-frame being substantially open along their length between their side members,
    fastening means front and rear on said sub-frame for securing a snowmobile to said sub-frame, said front fastening means including a support portion at the front end of said sub-frame which engages the ground when said sub-frame is pivoted to said lowered position whereby the front end of said snowmobile may be moved thereon and be lifted off the ground when said sub-frame is pivoted to said raised position.

2. The structure of claim 1 wherein said rear fastening means is adapted to extend under a snowmobile when said snowmobile and sub-frame are pivoted upwardly and support the rear end of a snowmobile when pivoted downwardly or to a horizontal position.

3. The structure of claim 2 wherein said rear fastening means is pivotally connected to one side member of said sub-frame and is adapted to pivot to a transversely extending position in locking engagement with said other side frame member.

4. The structure of claim 1 wherein said front fastening means is further defined as a bottom wall portion extending between the side frame members of said sub-frame at the front end thereof only.

5. The structure of claim 4 wherein said front fastening means further includes means for locking said snowmobile to said sub-frame to limit it against forward and rearward movement on said sub-frame.

6. The structure of claim 1 wherein a second U-shaped trailer frame and sub-frame are provided in side by side interconnected relationship to said first mentioned trailer frame and sub-frame and include similar structures and operation.

7. The structure of claim 6 wherein adjacent side frame members of said first and second trailer frames are one and the same.

8. A method of loading a snowmobile onto a trailer for transport comprising the steps of,
    pivoting on a U-shaped trailer frame a U-shaped sub-frame open at the rear downwardly to a lowered position with the front end thereof engaging the ground,
    moving a snowmobile into said sub-frame with the front end of said snowmobile resting on a support portion on the front end of said sub-frame,
    pivoting the sub-frame to an up position with the rear end thereof engaging the ground and the front end of said sub-frame and front end of said snowmobile being raised off the ground,
    securing the rear end of the sub-frame to the underside of the snowmobile,
    pivoting the subframe and snowmobile to a horizontal position, and
    locking said subframe to said trailer frame to limit further pivoting of said sub-frame relative to said trailer frame.

* * * * *